US012808386B2

(12) United States Patent
Tournois et al.

(10) Patent No.: US 12,808,386 B2

(45) Date of Patent: Nov. 24, 2026

(54) VENTILATION DEVICE FOR A MOTOR VEHICLE COOLING MODULE

(71) Applicant: VALEO SYSTEMES THERMIQUES, La Verriere (FR)

(72) Inventors: Remi Tournois, La Verriere (FR); Xavier Marchadier, La Verriere (FR); Fabien Bireaud, La Verriere (FR); Mathieu Caparros, La Verriere (FR); Jose Trindade, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 227 days.

(21) Appl. No.: 18/249,846

(22) PCT Filed: Sep. 27, 2021

(86) PCT No.: PCT/EP2021/076491

§ 371 (c)(1),
(2) Date: Apr. 20, 2023

(87) PCT Pub. No.: WO2022/083975

PCT Pub. Date: Apr. 28, 2022

(65) Prior Publication Data

US 2024/0011504 A1 Jan. 11, 2024

(30) Foreign Application Priority Data

Oct. 22, 2020 (FR) ...................................... 2010853

(51) Int. Cl.

*F04D 29/26* (2006.01)
*B60K 11/00* (2006.01)
*F04D 29/62* (2006.01)

(52) U.S. Cl.

CPC ............ *F04D 29/263* (2013.01); *B60K 11/00* (2013.01); *F04D 29/624* (2013.01)

(58) Field of Classification Search

CPC .... F04D 25/022; F04D 29/263; F04D 29/329; F04D 29/624

See application file for complete search history.

(56) References Cited

U.S. PATENT DOCUMENTS 3,644,066 A * 2/1972 Heob .................... F04D 25/062 310/90
5,944,497 A 8/1999 Kershaw et al.
(Continued)

FOREIGN PATENT DOCUMENTS

CN 2773361 Y 4/2006
CN 101265920 A 9/2008
(Continued)

OTHER PUBLICATIONS

European Patent Office, International Search Report (with English translation) and Written Opinion of corresponding International Application No. PCT/EP2021/076491, dated Jan. 12, 2022.
(Continued)

*Primary Examiner* — Kenneth J Hansen

(74) *Attorney, Agent, or Firm* — Osha Bergman Watanabe & Burton LLP

(57) ABSTRACT

The invention relates to a ventilation device (5) for a motor vehicle cooling module, comprising: 1. a member (6) with blades; 2. an electric motor (7); 3. a torque transmission part (8) arranged to transmit a torque developed by the electric motor (7) to the member (6) with blades; characterized in that the torque transmission part (8) comprises: a. a first attachment assembly for attaching the torque transmission part (8) to the member (6) with blades; b. and a second attachment assembly for attaching the torque transmission part (8) to the electric motor (7).

8 Claims, 8 Drawing Sheets

(56) References Cited

U.S. PATENT DOCUMENTS

| | | | | |
|---|---|---|---|---|
| 2012/0183417 | A1* | 7/2012 | Linnenbrock | F04D 29/646 417/410.1 |
| 2015/0078937 | A1 | 3/2015 | Crevel et al. | |
| 2023/0193918 | A1* | 6/2023 | Berling | F04D 29/626 416/204 R |

FOREIGN PATENT DOCUMENTS

| | | | |
|---|---|---|---|
| CN | 104081058 | A | 10/2014 |
| CN | 110431031 | A | 11/2019 |
| EP | 0921318 | A2 | 6/1999 |
| EP | 2430728 | A2 | 3/2012 |
| KR | 20140094149 | A | 7/2014 |
| WO | 2011047665 | A2 | 4/2011 |
| WO | 2013139982 | A1 | 9/2013 |
| WO | 2019229382 | A1 | 12/2019 |

OTHER PUBLICATIONS

Office Action issued in corresponding CN Office Action No. 2025180064809.9, dated May 30, 2025 (9 Pages with English Translation).

Office Action issued in corresponding China Application No. 202180064809.9, dated May 30, 2025. (12 pages).

Office Action issued in corresponding China Application No. 202180064809.9, dated Feb. 5, 2026. (12 pages).

* cited by examiner

VENTILATION DEVICE FOR A MOTOR VEHICLE COOLING MODULE

TECHNICAL FIELD

The invention relates to a ventilation device for a cooling module for a motor vehicle, in particular an electric vehicle. The invention also concerns such a cooling module and a motor vehicle, in particular an electric vehicle, which is provided with such a cooling module.

BACKGROUND OF THE INVENTION

A cooling module (or heat exchange module) of a motor vehicle conventionally has at least one heat exchanger and a ventilation device that is designed to generate a stream of air in contact with the at least one heat exchanger. The ventilation device thus makes it possible, for example, to generate a stream of air in contact with the heat exchanger when the vehicle is stationary.

In conventional motor vehicles with a combustion engine, the at least one heat exchanger has a substantially square shape, the ventilation device then being a blower-wheel fan with a diameter substantially equal to the side of the square formed by the heat exchanger.

Conventionally, the heat exchanger is then positioned facing at least two cooling openings formed in the front face of the body of the motor vehicle. A first cooling opening is located above the bumper, while a second opening is located below the bumper. Such a configuration is preferred since the combustion engine must also be supplied with air, the air intake of the engine conventionally being located in the passage of the stream of air passing through the upper cooling opening.

However, electric vehicles are preferably provided solely with cooling openings located below the bumper, and more preferably still with a single cooling opening located below the bumper.

This is because the electric motor does not need to be supplied with air. The reduction in the number of cooling openings also makes it possible to improve the aerodynamic characteristics of the electric vehicle. This also results in better autonomy and a higher top speed of the motor vehicle.

The present invention aims to improve such a cooling module.

SUMMARY OF THE INVENTION

A subject of the invention is a ventilation device for a cooling module for a motor vehicle, comprising: a bladed member, an electric motor, a torque transmission part arranged so as to transmit a torque developed by the electric motor toward the bladed member; characterized in that the torque transmission part has: a first fixing assembly for fixing the torque transmission part to the bladed member and a second fixing assembly for fixing the torque transmission part to the electric motor.

Thus, in the invention, the torque transmission part advantageously makes it possible, whilst still transmitting the torque developed by the electric motor and without reducing its cooling, to mount the bladed member on the motor more easily, notably by fixing without screws and blind by virtue of the first fixing assembly. The second fixing assembly makes it possible to reduce the bulk of the torque transmission part by virtue of assembling the torque transmission part on the motor separately from mounting the bladed member on the torque transmission part. The torque transmission part can thus be mounted on the motor beforehand, before assembling the bladed member on the torque transmission part. The first and the second fixing assembly also enable good concentricity of the parts so as to ensure good rotation at high speed.

According to one of the aspects of the invention, the first fixing assembly and the second fixing assembly are at different distances from an axis of rotation of the electric motor.

According to one of the aspects of the invention, the second fixing assembly is further away from the axis of rotation of the electric motor than the first fixing assembly is.

According to one of the aspects of the invention, the first fixing assembly has a recessed central column positioned in the center of the torque transmission part.

According to one of the aspects of the invention, the central column is wider at its base than at its free end.

According to one of the aspects of the invention, the bladed member has a guide pad that extends in the axis of rotation of the electric motor and is able to be inserted into the central column.

According to one of the aspects of the invention, the guide pad extends from a plate.

According to one of the aspects of the invention, the bladed member has a first retaining tab arranged to interact with the first fixing assembly.

According to one of the aspects of the invention, the first retaining tab has the shape of an L. This shape makes it possible to close off all the degrees of freedom for good mounting of the bladed member on the torque transmission part.

According to one of the aspects of the invention, the first retaining tab is attached to the bladed member from the plate.

According to one of the aspects of the invention, the first retaining tab has an anti-rotation wall for avoiding the bladed member becoming disassembled from the torque transmission part.

According to one of the aspects of the invention, the first retaining tab has an axial-holding wall positioned parallel to the plate. Axial is to be understood to mean the axis of rotation of the electric motor.

According to one of the aspects of the invention, the axial-holding wall has a surface which is slightly inclined in relation to a plane extending radially to the axis of rotation of the electric motor and which is positioned facing the plate.

According to one of the aspects of the invention, the slightly inclined surface forms an angle of preferably between 3 and 5 degrees in relation to the plane extending radially to the axis of rotation of the electric motor.

According to one of the aspects of the invention, the first fixing assembly has a window through which the anti-rotation wall passes and a contact zone which extends from a lip of the window and against which the inclined surface of the axial-holding wall bears to ensure the position is tightly maintained.

According to one of the aspects of the invention, the window has two edges in the shape of a section of a circle, these sections being connected to one another by two rectilinear edges.

According to one of the aspects of the invention, the contact zone is a planar surface comprised in a first plane longitudinally distant from a second plane, which comprises the free end of the central column.

According to one of the aspects of the invention, the plate of the bladed member has at least one protrusion, preferably two protrusions, which extends toward the slightly inclined surface of the retaining tab to ensure said torque transmission part is tightly mounted.

According to one of the aspects of the invention, the bladed member has a second retaining tab having the same features as the first retaining tab.

According to one of the aspects of the invention, the first fixing assembly has a snap-fastening element for locking the rotation of the bladed member.

According to one of the aspects of the invention, the snap-fastening element is attached to the torque transmission part from a longitudinal wall, which extends between the first and the second plane.

According to one of the aspects of the invention, the plate of the bladed member has a locking lug on which the snap-fastening element locks.

According to one of the aspects of the invention, the locking lug has a guide ramp for guiding the snap-fastening element.

According to one of the aspects of the invention, the snap-fastening element has a snap-fastening head, which, after having traversed the guide ramp and under the elastic return effect of the snap-fastening head, locks on the locking lug.

According to one of the aspects of the invention, the snap-fastening element has a curve.

According to one of the aspects of the invention, the bladed member has a base.

According to one of the aspects of the invention, the plate is attached to the base by ribs.

According to one of the aspects of the invention, the ribs extend radially from the axis of rotation of the electric motor.

According to one of the aspects of the invention, the torque transmission part is a part with the overall shape of a disk, the lip of which comprises a skirt extending longitudinally to the axis of rotation of the electric motor. The skirt makes it possible to stiffen the torque transmission part.

According to one of the aspects of the invention, the torque transmission part is made of plastics material.

According to one of the aspects of the invention, the bladed member is made of plastics material.

According to one of the aspects of the invention, the second fixing assembly has at least one orifice arranged to receive at least one screw, which is to be screwed to the electric motor. The use of screws makes it possible to perform standard mounting.

According to one of the aspects of the invention, the screw has a screw head and a thread.

According to one of the aspects of the invention, the orifice is disposed on a truncated cone.

According to one of the aspects of the invention, the truncated cone has a planar end, which bears against the electric motor.

According to one of the aspects of the invention, the truncated cone has a cylindrical housing for housing the screw head.

According to one of the aspects of the invention, when the screw is in the position in which it is screwed to the electric motor, the screw head is entirely housed in the cylindrical housing.

According to one of the aspects of the invention, the second fixing assembly has three orifices, arranged to each receive a screw, which is to be screwed to the electric motor.

According to one of the aspects of the invention, the torque transmission part has at least one opening between two orifices. This opening makes it possible to reduce the weight of the torque transmission part and enables good cooling of the electric motor.

According to one of the aspects of the invention, there are three openings between two orifices.

According to one of the aspects of the invention, the electric motor is of brushless DC type.

According to one of the aspects of the invention, the electric motor has a stator and a rotor.

According to one of the aspects of the invention, the rotor has at least one opening aligned with the opening in the torque transmission part.

According to one of the aspects of the invention, the at least one opening in the rotor and the at least one opening in the torque transmission part have the same shape.

According to one of the aspects of the invention, the rotor has the shape of a flat-bottomed bell.

According to one of the aspects of the invention, the electric motor has at least one tapped thread which faces the at least one orifice and is intended for screwing the screw to the electric motor and holding the torque transmission part in place.

According to one of the aspects of the invention, the at least one screw is screwed to the rotor of the electric motor.

According to one of the aspects of the invention, the second fixing assembly has at least one guide finger for aligning the at least one orifice with the at least one tapped thread.

According to one of the aspects of the invention, the rotor has at least one guide hole for receiving the at least one guide finger.

According to one of the aspects of the invention, the bladed member is a tangential blower wheel configured to create a stream of air flowing in a direction substantially perpendicular to the axis of rotation of the electric motor.

Another subject of the invention is a cooling module having the ventilation device, and a heat exchanger positioned in the path of the air generated by the ventilation device.

Another subject of the invention is a method for assembling a ventilation device for a cooling module for a motor vehicle, said method having the following assembly steps: a first step of pre-assembling a torque transmission part on an electric motor by screwing; a second step of inserting a guide pad of the bladed member into a recessed central column of the torque transmission part; a third step of locking the bladed member on the torque transmission part by way of performing a rotational movement until snap-fastening occurs.

BRIEF DESCRIPTION OF THE DRAWINGS

Other features, details and advantages of the invention will become apparent upon reading the detailed description below, and upon analyzing the appended drawings, in which.

DETAILED DESCRIPTION OF THE INVENTION

Figure 1:
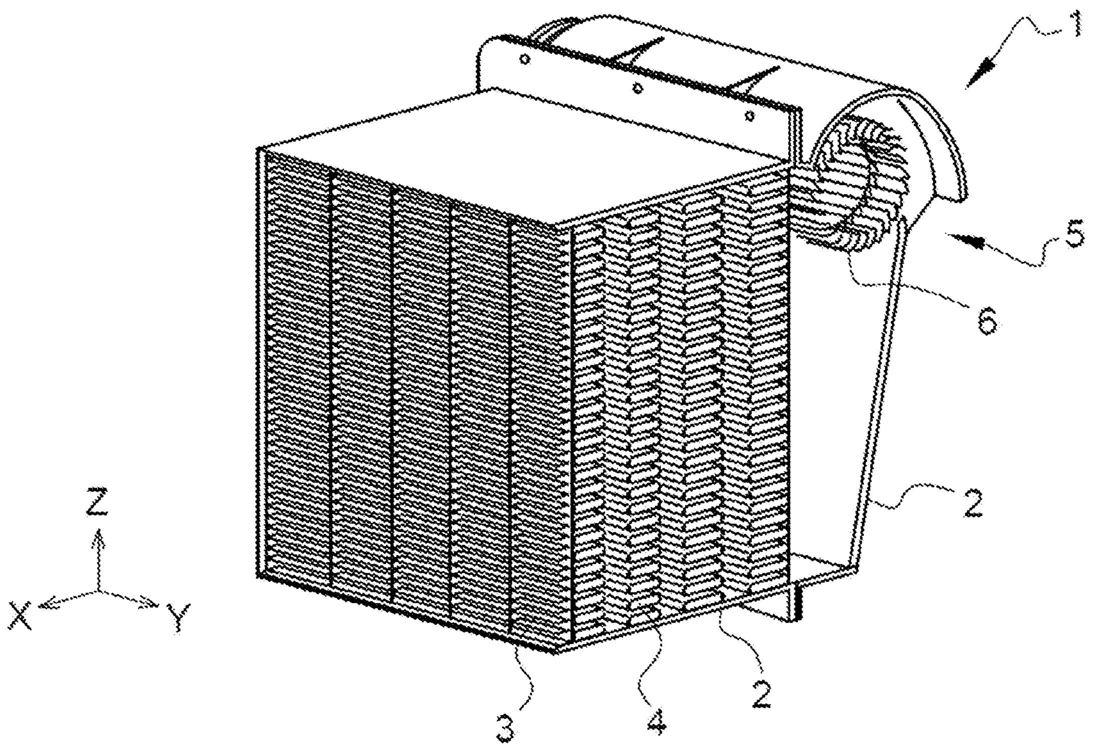
FIG. 1 schematically shows a view, in section, of a cooling module according to an exemplary embodiment of the invention.

FIG. 1 describes a cooling module 1 of a motor vehicle, notably having an electric motor. As illustrated in section in this FIG. 1, the cooling module 1 has a casing or fairing 2 forming an internal channel 3. The casing 2 makes it possible to house at least one heat exchanger 4 and a ventilation device 5 according to an exemplary embodiment of the invention. This ventilation device 5 has a bladed member 6.

Figure 2:
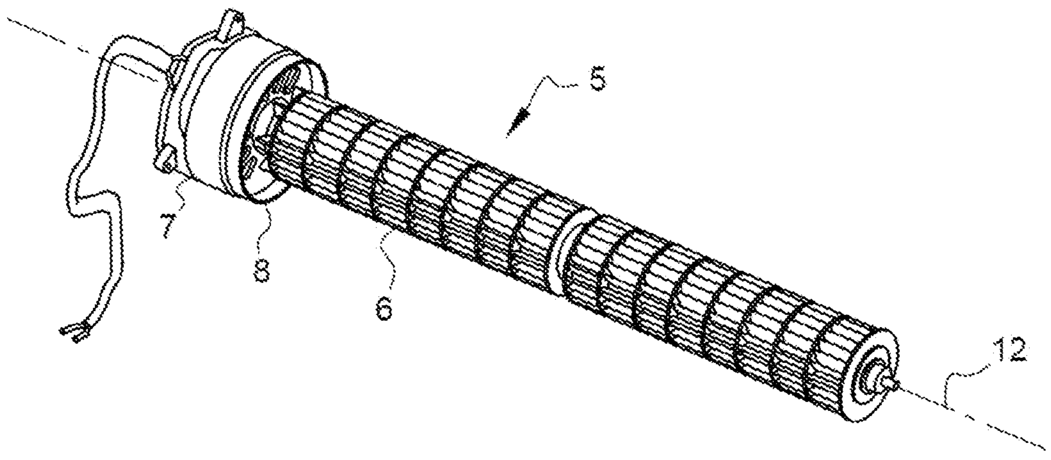
FIG. 2 is a schematic perspective view of the ventilation device of the cooling module of FIG. 1.

FIG. 2 shows the ventilation device 5 of FIG. 1. This ventilation device 5 comprises: the bladed member 6, an electric motor 7, a torque transmission part 8 arranged so as to transmit a torque 9 developed by the electric motor 7 toward the bladed member 6; characterized in that the torque transmission part 8 has: a first fixing assembly 10 for fixing the torque transmission part 8 to the bladed member 6 and a second fixing assembly 11 for fixing the torque transmission part 8 to the electric motor 7.

Figure 3:
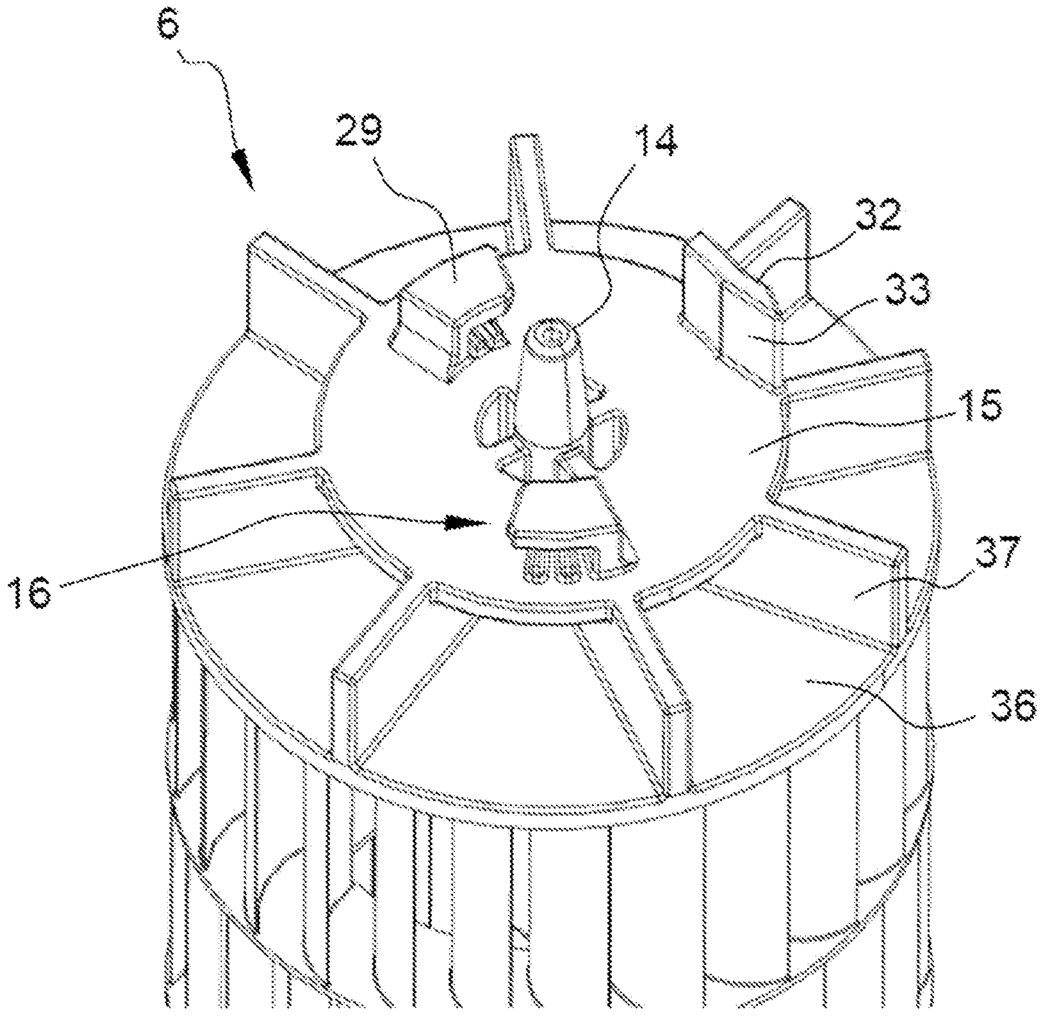
FIG. 3 is a schematic perspective view of the bladed member of the ventilation device of FIG. 2.
Figure 5:
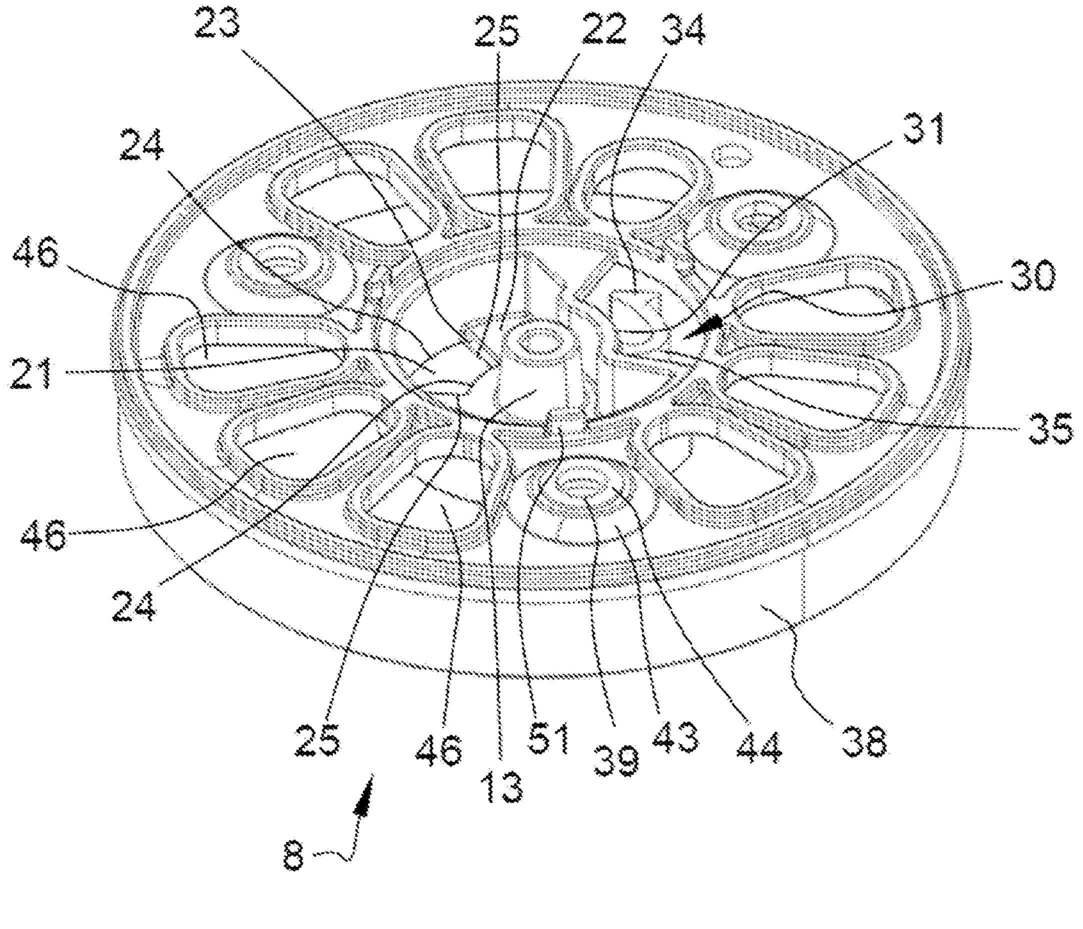
FIG. 5 is a schematic perspective view of the torque transmission part of the ventilation device of FIG. 2.

FIGS. 3 and 5 illustrate the bladed member 6 and the torque transmission part 8, respectively. As illustrated in the figures, the first fixing assembly 10 and the second fixing assembly 11 are at different distances from an axis of rotation 12 of the electric motor 7.

The second fixing assembly 11 is further away from the axis of rotation 12 of the electric motor 7 than the first fixing assembly 10 is.

The first fixing assembly 10 has a recessed central column 13 positioned in the center of the torque transmission part 8.

The central column 13 is wider at its base than at its free end.

The bladed member 6 has a guide pad 14 that extends in the axis of rotation 12 of the electric motor 7 and is able to be inserted into the central column 13.

The guide pad 14 extends from a plate 15.

Figure 4:
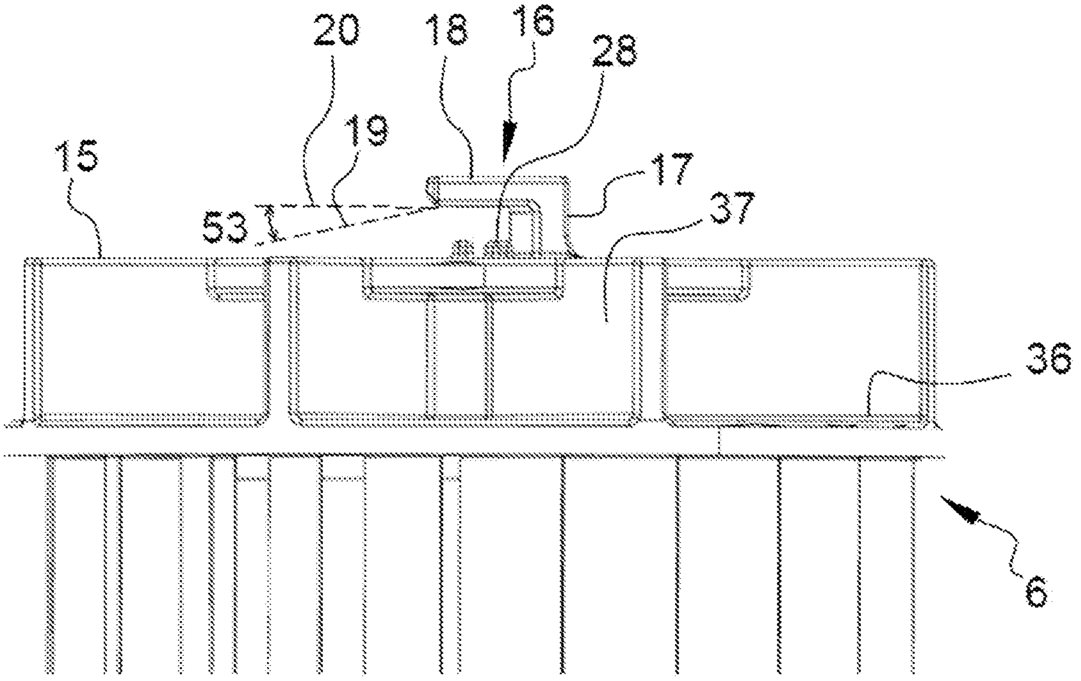
FIG. 4 is a schematic view of the first retaining tab of the bladed member of FIG. 3.

The bladed member 6 has a first retaining tab 16 arranged to interact with the first fixing assembly 10. FIG. 4 is a view of a detail of the bladed member 6 with the first retaining tab 16 being particularly visible.

The first retaining tab 16 has the shape of an L.

The first retaining tab 16 is attached to the bladed member 6 from the plate 15.

The first retaining tab 16 has an anti-rotation wall 17 for avoiding the bladed member 6 becoming disassembled from the torque transmission part 8.

The first retaining tab 16 has an axial-holding wall 18 positioned parallel to the plate 15. Axial is to be understood to mean the axis of rotation 12 of the electric motor 7.

The axial-holding wall 18 has a surface 19 which is slightly inclined in relation to a plane 20 extending radially to the axis of rotation 12 of the electric motor 7 and which is positioned facing the plate 15.

The slightly inclined surface 19 forms an angle 53 of preferably between 3 and 5 degrees in relation to the plane 20 extending radially to the axis of rotation 12 of the electric motor 7.

The first fixing assembly 10 has a window 21 through which the anti-rotation wall 17 passes and a contact zone 22 which extends from a lip 23 of the window 21 and against which the inclined surface 19 of the axial-holding wall 18 bears to ensure the position is tightly maintained.

The window 21 has two edges 24 in the shape of a section of a circle, these sections 24 being connected to one another by two rectilinear edges 25.

The contact zone 22 is a planar surface comprised in a first plane 26 longitudinally distant from a second plane 27, which comprises the free end of the central column 13.

The plate 15 of the bladed member 6 has at least one protrusion 28, preferably two protrusions, which extends toward the slightly inclined surface 19 of the retaining tab 16 to ensure said torque transmission part 8 is tightly mounted.

The bladed member 6 has a second retaining tab 29 with the same features as the first retaining tab 16.

The first fixing assembly 10 has a snap-fastening element 30 for locking the rotation of the bladed member 6.

The snap-fastening element 30 is attached to the torque transmission part 8 from a longitudinal wall 31, which extends between the first plane 26 and the second plane 27.

The plate 15 of the bladed member 6 has a locking lug 32 on which the snap-fastening element 30 locks.

The locking lug 32 has a guide ramp 33 for guiding the snap-fastening element 30.

Figure 6:
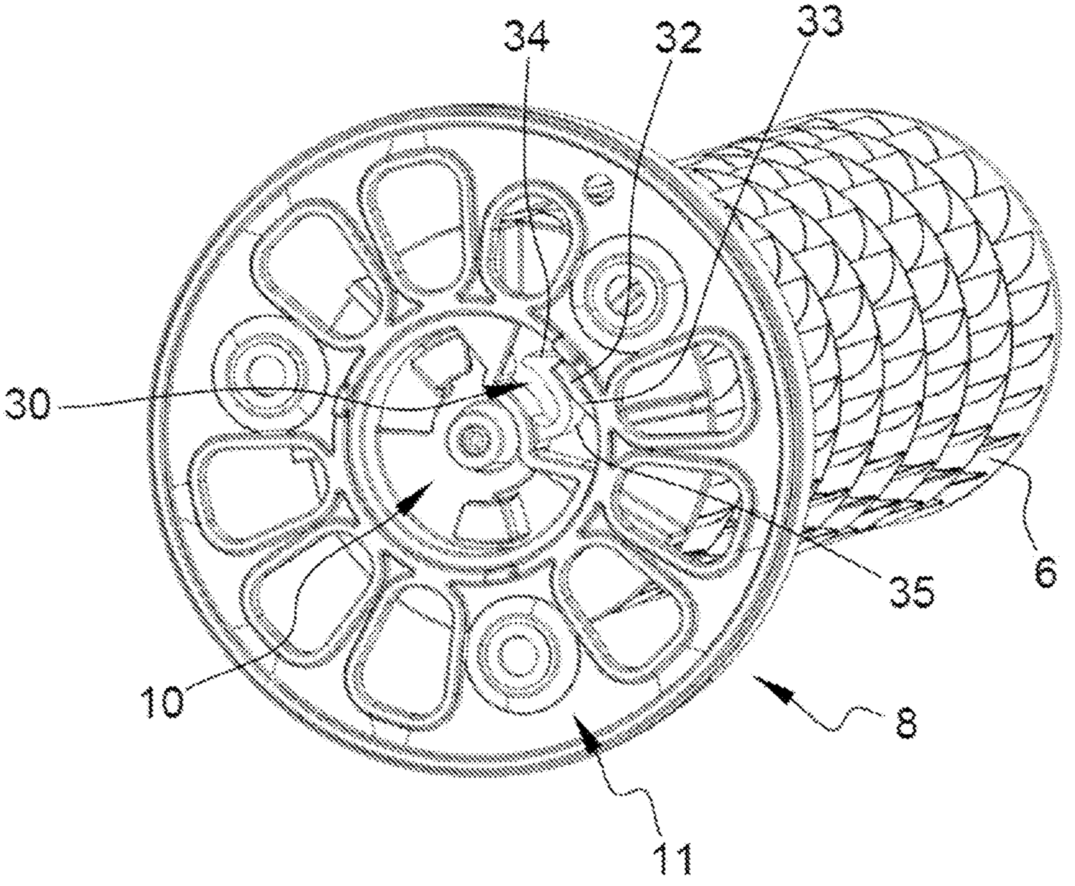
FIG. 6 is a schematic perspective view of the bladed member once it has been assembled on the torque transmission part of FIG. 5.

The snap-fastening element 30 has a snap-fastening head 34, which, after having traversed the guide ramp 33 and under the elastic return effect of the snap-fastening head 34, locks on the locking lug 32, as can be seen in FIG. 6.

The snap-fastening element 30 has a curve 35.

The bladed member 6 has a base 36.

The plate 15 is attached to the base 36 by ribs 37.

The ribs 37 extend radially from the axis of rotation 12 of the electric motor 7.

The torque transmission part 8 is a part with the overall shape of a disk, the lip of which comprises a skirt 38 extending longitudinally to the axis of rotation 12 of the electric motor 7. The skirt 38 makes it possible to stiffen the torque transmission part 8.

The torque transmission part 8 is made of plastics material.

The bladed member 6 is made of plastics material.

The second fixing assembly 11 has at least one orifice 39 arranged to receive at least one screw 40 which is to be screwed to the electric motor 7.

The screw 40 has a screw head 41 and a thread 42.

The orifice 39 is disposed on a truncated cone 43.

The truncated cone 43 has a planar end 44, which bears against the electric motor 7.

Figure 8:
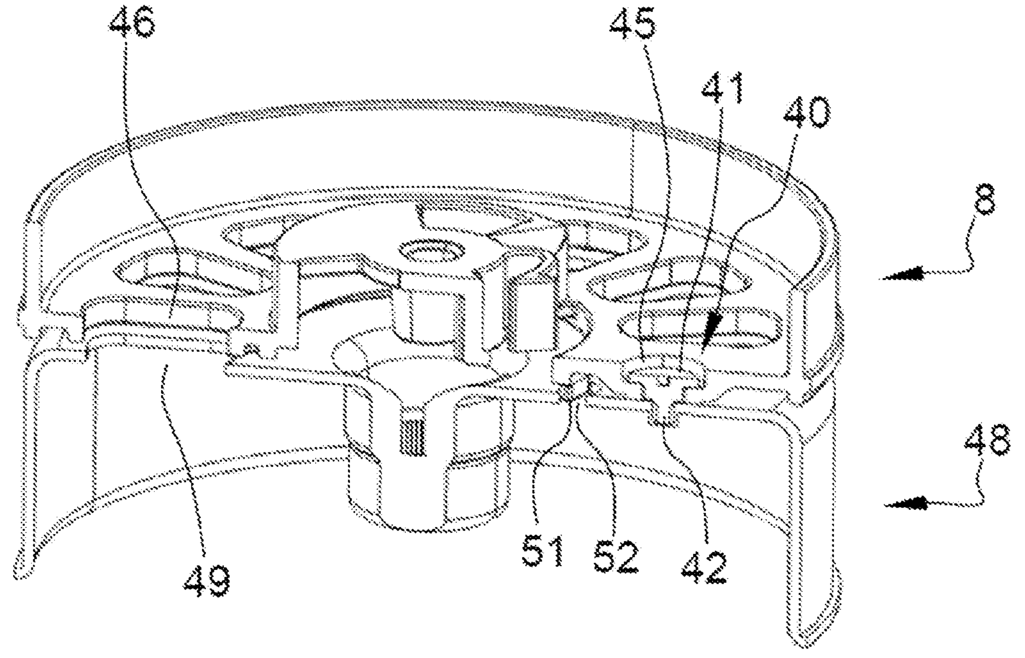
FIG. 8 is a schematic view, in section, of the torque transmission part assembled on the rotor of the electric motor of the ventilation device of FIG. 2.

The truncated cone 43 has a cylindrical housing 45 for housing the screw head 41, as can be seen particularly in FIG. 8.

When the screw 40 is in the position in which it is screwed to the electric motor 7, the screw head 41 is entirely housed in the cylindrical housing 45.

The second fixing assembly 11 has three orifices 39 arranged to each receive a screw 40, which is to be screwed to the electric motor 7.

The torque transmission part 8 has at least one opening 46 between two orifices 39. This opening 46 makes it possible to reduce the weight of the torque transmission part 8 and enables good cooling of the electric motor 7.

There are three openings 46 between two orifices 39.

The electric motor 7 is of brushless DC type.

The electric motor 7 has a stator 47 and a rotor 48.

Figure 7:
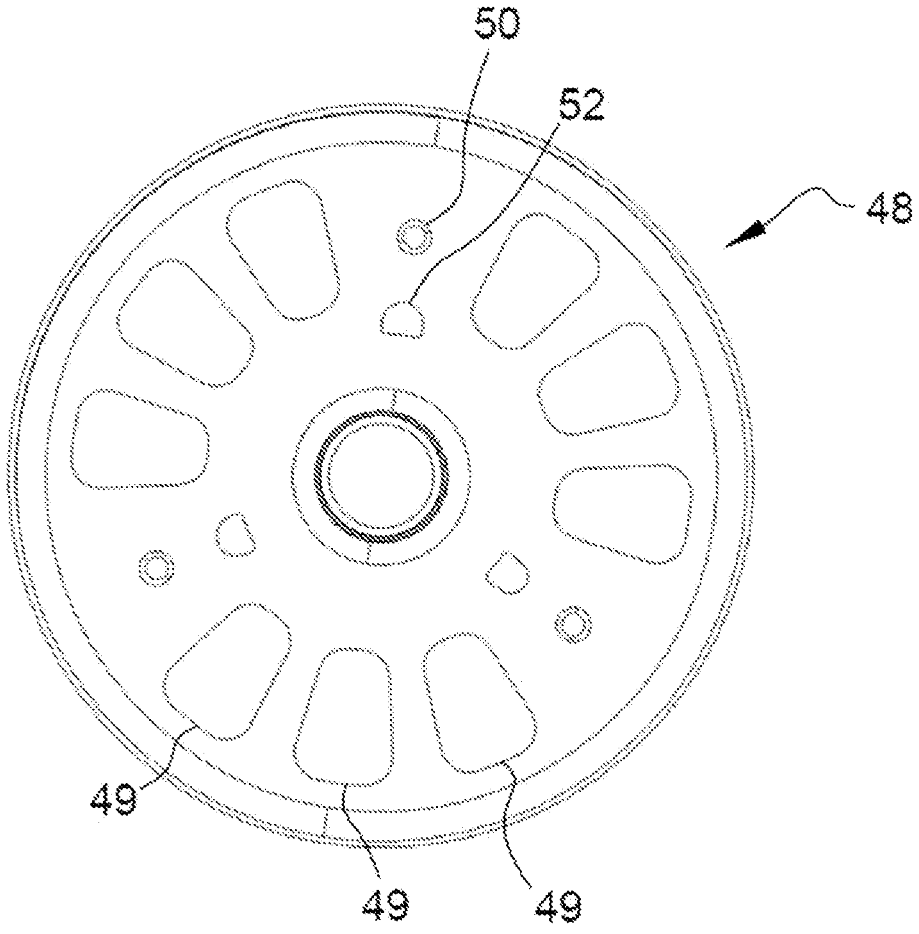
FIG. 7 is a schematic front view of the rotor of the electric motor of the ventilation device of FIG. 2.

The rotor 48, shown on its own in FIG. 7, has at least one opening 49 aligned with the opening 46 in the torque transmission part 8, as can be seen particularly in FIG. 8.

The at least one opening in the rotor 49 and the at least one opening 46 in the torque transmission part 8 have the same shape.

The rotor 48 has the shape of a flat-bottomed bell.

The electric motor 7 has at least one tapped thread 50 which faces the at least one orifice 39 and is intended for screwing the screw 40 to the electric motor 7 and holding the torque transmission part 8 in place.

The at least one screw 40 is screwed to the rotor 48 of the electric motor 7.

The second fixing assembly 11 has at least one guide finger 51 for aligning the at least one orifice 39 with the at least one tapped thread 50.

The rotor 48 has at least one guide hole 52 for receiving the at least one guide finger 51.

The bladed member 6 is a tangential blower wheel configured to create a stream of air flowing in a direction substantially perpendicular to the axis of rotation 12 of the electric motor 7.

A cooling module 1 having a ventilation device 5 according to an exemplary embodiment of the invention, and a heat exchanger 4 positioned in the path of the air generated by the ventilation device 5.

A method for assembling a ventilation device 5 for a cooling module 1 for a motor vehicle, said method having the following assembly steps: a first step of pre-assembling a torque transmission part 8 on an electric motor 7 by screwing; a second step of inserting a guide pad 14 of the bladed member 6 into a recessed central column 13 of the torque transmission part 8; a third step of locking the bladed member 6 on the torque transmission part 8 by way of performing a rotational movement until snap-fastening occurs.

The invention claimed is:

1. A ventilation device for a cooling module for a motor vehicle, comprising:

a bladed member;

an electric motor;

a torque transmission part arranged so as to transmit a torque developed by the electric motor toward the bladed member; the torque transmission part including:

a first fixing assembly for fixing the torque transmission part to the bladed member, and a second fixing assembly for fixing the torque transmission part to the electric motor, wherein the first fixing assembly and the second fixing assembly are at different distances from an axis of rotation of the electric motor, wherein the first fixing assembly has a snap-fastening element for locking the rotation of the bladed member, wherein the second fixing assembly has at least one orifice arranged to receive at least one screw which is to be screwed to the electric motor, and wherein the second fixing assembly has at least one guide finger for aligning the at least one orifice with at least one tapped thread that faces the at least one orifice.

2. The ventilation device as claimed in claim 1, wherein the bladed member is a tangential blower wheel configured to create a stream of air flowing in a direction substantially perpendicular to the axis of rotation of the electric motor.

3. The ventilation device as claimed in claim 1, wherein the first fixing assembly has a recessed central column positioned in the center of the torque transmission part.

4. The ventilation device as claimed in claim 1, wherein the bladed member has a first retaining tab arranged to interact with the first fixing assembly.

5. The ventilation device as claimed in claim 1, wherein the bladed member has a base.

6. The ventilation device as claimed in claim 1, wherein the electric motor has a stator and a rotor.

7. The ventilation device as claimed in claim 1, wherein the second fixing assembly has three orifices arranged to each receive a screw which is to be screwed to the electric motor.

8. A method for assembling a ventilation device for a cooling for a motor vehicle including:

a bladed member with a guide pad;

an electric motor;

a torque transmission part arranged so as to transmit a torque developed by the electric motor toward the bladed member; the torque transmission part including:

a first fixing assembly for fixing the torque transmission part to the bladed member, with a recessed central column positioned in the center of the torque transmission part and adapted for snap-fastening with the guide pad of the bladed member, and a second fixing assembly for fixing the torque transmission part to the electric motor, said method comprising:

pre-assembling torque transmission part on the electric motor by screwing;

inserting the guide pad of the bladed member into the recessed central column of the torque transmission part;

locking the bladed member on the torque transmission part by way of performing a rotational movement until snap-fastening occurs, wherein the first fixing assembly and the second fixing assembly are at different distances from an axis of rotation of the electric motor, wherein the first fixing assembly has a snap-fastening element for locking the rotation of the bladed member, wherein the second fixing assembly has at least one orifice arranged to receive at least one screw which is to be screwed to the electric motor, and wherein the second fixing assembly has at least one guide finger for aligning the at least one orifice with at least one tapped thread that faces the at least one orifice.

* * * * *